(12) United States Patent
Suau et al.

(10) Patent No.: US 8,791,199 B2
(45) Date of Patent: *Jul. 29, 2014

(54) ASSOCIATIVE MONOMER WITH AN OXO ALCOHOL BASE, AN ACRYLIC POLYMER CONTAINING THIS MONOMER, USE OF THE SAID POLYMER AS A THICKENING AGENT IN AN AQUEOUS FORMULATION, FORMULATION OBTAINED

(75) Inventors: Jean-Marc Suau, Lucenay (FR); Denis Ruhlmann, Genay (FR)

(73) Assignee: Coatex S.A.S., Genay (FR)

( * ) Notice: Subject to any disclaimer, the term of this patent is extended or adjusted under 35 U.S.C. 154(b) by 192 days.

This patent is subject to a terminal disclaimer.

(21) Appl. No.: 13/036,211

(22) Filed: Feb. 28, 2011

(65) Prior Publication Data

US 2011/0213072 A1    Sep. 1, 2011

Related U.S. Application Data

(60) Provisional application No. 61/314,754, filed on Mar. 17, 2010.

(30) Foreign Application Priority Data

Feb. 26, 2010    (FR) ...................... 10 51366

(51) Int. Cl.
  *C08L 31/00*    (2006.01)
(52) U.S. Cl.
  USPC ........................................ 524/558

(58) Field of Classification Search
  USPC ............................................ 524/558
  See application file for complete search history.

(56) References Cited

U.S. PATENT DOCUMENTS

| 4,668,410 A | 5/1987 | Haas et al. |
| 4,769,167 A | 9/1988 | Haas et al. |
| 7,790,800 B2 | 9/2010 | Suau et al. |
| 2008/0103248 A1 | 5/2008 | Suau et al. |
| 2008/0306218 A1 | 12/2008 | Madle et al. |
| 2011/0065836 A1 | 3/2011 | Suau et al. |

FOREIGN PATENT DOCUMENTS

| EP | 2 003 152 A1 | 12/2008 |
| WO | WO 2006/016035 A1 | 2/2006 |
| WO | WO 2006/130675 A2 | 12/2006 |
| WO | WO 2006130675 A2 * | 12/2006 |

OTHER PUBLICATIONS

French Search Report issued Sep. 15, 2010, in Patent Application No. FR 1051366.
U.S. Appl. No. 13/036,039, filed Feb. 28, 2011, Suau, et al.

* cited by examiner

*Primary Examiner* — Ling Choi
*Assistant Examiner* — Lanee Reuther
(74) *Attorney, Agent, or Firm* — Oblon, Spivak, McClelland, Maier & Neustadt, L.L.P.

(57) ABSTRACT

A HASE-type rheology modifier containing an associative monomer which is functionalised by a hydrophobic group of an oxo alcohol base is provided. A method to prepare the HASE rheology modifier and its use in a method to thicken and create a Newtonian rheological profile in an aqueous formulation such as a water based paint is also provided.

15 Claims, No Drawings

ASSOCIATIVE MONOMER WITH AN OXO ALCOHOL BASE, AN ACRYLIC POLYMER CONTAINING THIS MONOMER, USE OF THE SAID POLYMER AS A THICKENING AGENT IN AN AQUEOUS FORMULATION, FORMULATION OBTAINED

CROSS REFERENCE TO RELATED APPLICATIONS

This application claims priority to French Application No. 1051366, filed Feb. 26, 2010, and U.S. Provisional Application No. 61/314,754, filed Mar. 17, 2010, the disclosures of which are incorporated herein by reference in their entireties.

FIELD OF THE INVENTION

The present invention concerns new HASE-type rheology modifiers, the associative monomer of which is functionalised by a hydrophobic group with an oxo alcohol base. When used in formulations containing water such as water-based paints, these products lead to a phenomenon of increased viscosity over a wide range of shearing gradients, and most particularly for high gradients. The rheology modifiers described in this invention perform as effective thickening agents, and as such constitute an advantageous new range of products available to paint formulators.

In a very advantageous manner, these new thickening agents, when introduced into an aqueous formulation, may develop rheological profiles which are far more Newtonian than conventionally known HASE-type rheology modifiers, while providing an economically advantageous level of effectiveness. Such a result may be obtained through the use of the abovementioned particular associative monomers. This property may even be exacerbated in a preferential variant which consists in adjusting within a certain interval the dose of chain transfer agent used in the method of manufacture of the said polymers.

The associative monomers functionalised by oxo alcohol base hydrophobic groups constitute one object of the present invention. The same applies to the HASE-type polymers incorporating such monomers, and to their method of synthesis. The use of the latter as thickening agents in water-based formulations, and the resulting formulations, constitute the final two objects of the present invention.

Controlling the rheology of a paint, both in the stage of its manufacture, and during its transport, storage or use, remains a priority at the current time. The wide variety of constraints observed in each of these steps relates to a multiplicity of different rheological properties. Nevertheless, it is possible to summarise the requirement of the skilled man in the art in obtaining an effect of the thickening of the said paint, both for reasons of stability over time, and for a possible application to a vertical surface, lack of splashing at the moment of use, or of dripping subsequently, etc. For this reason the products which contribute to this regulation of the rheological properties have been designated by the term thickening agents.

Historically, since the 1950's. cellulose-based gums and products have been used as thickening agents due to their high molecular weight. However, these compounds have a number of disadvantages, such as their instability over time (see document U.S. Pat. No. 4,673,518), the need to use a large quantity of them (see document EP 0 250 943 A1), and their production costs, notably in terms of waste treatment (see document U.S. Pat. No. 4,384,096).

Thickening agents of the type called "associative" thickening agents were developed to overcome the deficiencies of the cellulose-based gums. Associative thickening agents are water-soluble polymers having insoluble hydrophobic groups. Such macromolecules have an associating character: when introduced into water, the hydrophobic groups tend to assemble in the form of micellar aggregates. These aggregates are linked together by the hydrophilic parts of the polymers and a three-dimensional network is then formed which causes the viscosity of the medium to be increased. The operating mechanism and their characteristics are described, for example in the documents "Rheology modifiers for waterborne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these "associative" thickening agents, a distinction is made between the category designated as HEURs (Hydrophobically modified Ethylene oxide URethane), and HASEs (Hydrophobically modified Alkali-Soluble Emulsions). The HEURs polymers may be obtained by synthesis involving a compound of the polyalkylene glycol type, a polyisocyanate, and an alkyl and/or aryl associative monomer consisting of a hydrophobic terminal group. The HEURs polymers may be obtained by polymerization of (meth)acrylic acid, of an ester of a (meth)acrylic acid and of an associative monomer consisting of an oxyalkylated chain terminated by a hydrophobic group.

HEURs are conventionally employed to control and adjust properties of water-based paints, wherein, notably the effect obtained depends on the nature of the associative monomer, contained. Such utility is described by the following patent applications registered by the company COATEX™:

EP 0 639 595 A1, which proposes hydrophobic groups having 4 to 36 carbon atoms to increase the Brookfield™ viscosity, WO 02/102868 A1 which describes the use of polystyrylphenols with more than 40 atoms to increase the viscosity, whatever the shearing gradient, and finally EP 1 425 325 A1, which reveals an associative monomer consisting of di- and tristyrylphenol, enabling an excellent pigmentary compatibility and a high viscosity with low and medium shearing gradient to be obtained.

Similarly, the utility of HASE chemicals is described in the following patent applications registered by COATEX™:

EP 0 577 526 A1, which describes a fatty chain with linear or branched units of the alkyl and/or aryl type, having 26 to 30 carbon atoms, to develop high viscosities under a low shearing gradient, and EP 1 778 797 A1, which describes a branched terminal chain comprising 10 to 24 carbon atoms, to improve the pigmentary compatibility, and increase the viscosity generally.

In order to more completely have control of product rheology, paint formulators seek, in addition to a new family of products enabling the viscosity to be increased over a wide range of shearing gradients, to have thickening agents which will induce a particular rheological profile, depending on the schedule of specifications of the applicator or of the formulator. One such particular need is directed to gloss and satin paints where having a "Newtonian" profile, would provide an improvement of their spreading and a reduction of projections during their application.

In theory, a "Newtonian" profile signifies that the viscosity remains independent of the shearing gradient, however, such properties are believed possible, in reality. Thus in conventional practice, the skilled man in the art associates such a "Newtonian" profile with a low degree of change of viscosity depending on the shearing rate (rheogram proportionately flatter), in contrast to a pseudo-plastic profile, characterised by a marked fall in the viscosity depending on this gradient (rheogram proportionately more sloping). In tangible terms, the lower the ratio between the Brookfield viscosity at 10 revolutions per minute, in mPa·s, and the cone-plan viscosity, known as the "ICI" (which corresponds approximately to a speed gradient of 10,000 s$^{-1}$), the closer one comes to a Newtonian behaviour.

When having achieved Newtonian behaviour, retention of thickening efficacy at a high shearing rate is important and constitutes a second requirement, which may be reflected by a search in a concomitant manner for as high as possible an ICI viscosity.

Currently, the conventionally employed technology of HEURs and HASEs enables associative thickening agents to be formulated, which develop Newtonian profiles when they are introduced into aqueous formulations. This is described in the document "Disperse phase—thickeners interactions and their influence on Newtonian to non-Newtonian flow behavior" (Polymeric Materials, 1995), 73, 195-6).

In the case of HEURs, U.S. Pat. No. 5,500,475, describing a thickening agent in this category which, once used in an aqueous paint, develops a Newtonian profile whilst leading to a dry film with a high degree of brightness, which is water-resistant and abrasion-resistant, and also resistant to microbial contamination.

However, the HEURs are chemical species of low water solubility, and must be put into solution in the presence of solvents or surfactants, if their % of active material exceeds approximately 25%, and provided they develop Newtonian profiles. This problem is described in EP 0 682 094 A1 where the proposed solution is based on the use of surfactants. In addition, thickening agents of the HEUR type, which are highly concentrated and contain surfactants, have been sold by the company COATEX under the names COAPUR™ 5035 and COAPUR™ 6050, from 1993 in the case of the first of these.

The use of solvents and surfactants to formulate the HEUR-type thickening agent poses a number of problems. Firstly, many typical solvents are subject to increasing legislation aimed at restricting and even prohibiting their use in paints. As for the surfactants of the thickening formulation, their nature is such that they destabilise paints, through interaction with the other surfactants contained in these paints. Consequently, the formulation of HEURs of Newtonian type in water is only possible provided the polyurethane concentration is drastically restricted (of the order of 20% by weight), which makes these thickening agents ineffective.

Among the conventional HASEs, the only ones which prove genuinely effective in developing Newtonian profiles are thickening agents having an associative monomer which contains ethoxylated alkylphenols (APE is the English acronym). Such materials are described in EP 0 350 414 A1, which provides the use of ethoxylated nonylphenols for the synthesis of the associative monomer of a HASE-type thickening agent, and shows that the resulting polymer enables Newtonian rheological profiles to be developed once introduced into a water-based paint. Nonetheless, alkylphenols are currently widely suspected of being carcinogenic, and dangerous for reproduction. Thus, although still tolerated in the paints industry they nonetheless remain in the firing line of the legislative institutions in this area, notably in Europe.

DETAILED DESCRIPTION OF THE INVENTION

In view of the above-identified problems, the inventors have succeeded in developing new associative monomers, useful in the composition of HASE-type polymers, and providing the following advantages:

the possibility of developing, on the basis of these new associative monomers, a new range of HASE-type thickening agents, capable of thickening an aqueous formulation over a very large shearing gradient interval (and notably over the range of the high gradients), thus avoiding the use of HEURs which require solvents and/or surfactants in their formulation in order to be effective;

moreover, these new thickening agents enable particularly marked Newtonian profiles to be developed, notably in terms of ratio (Brookfield viscosity at 10 revolutions per minute, in mPa·s/ICI viscosity), whilst maintaining a substantial ICI viscosity;

lastly, this latter property is exacerbated according to a particular variant of the invention, which consists in adjusting the chain transfer agent rate in a certain interval, in the course of the manufacture of these thickening agents.

Thus according to one embodiment of the invention, thickening agents containing an associative monomer of formula (I):

wherein:

m and n are integers of less than 150, at least one of which is non-zero,

A and B designate alkyl groups which are different one from another, and having 2 to 4 carbon atoms, where group AO preferentially designates ethylene oxide, and group BO preferentially designates propylene oxide, R designates a polymerisable unsaturated group, preferentially methacrylate, and R' comprises at least one group of formula (II):

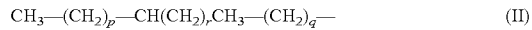

where p and q designate integers at least one of which is non-zero, with 5<p+q<13, r is an integer between 0 and 5, preferentially equal to 0.

One of the keys of the present invention is based on the selection of compounds of formula (II), as a terminal hydrophobic group of the associative monomer of formula (I). This latter is traditionally manufactured by ethoxylation of an alcohol, followed by functionalisation with a view to making it polymerisable. In the context of the present invention, the Inventor has observed that the particular choice of an oxo alcohol allowed the synthesis of new associative monomers of formula (I), which ultimately provides all the properties listed above.

Oxo alcohols according to the invention are of Formula (III):

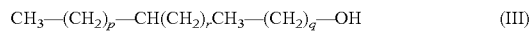

where p, q and r have the previously indicated meanings. These oxo alcohols are obtained by hydroformylation of an alkene with a synthesis gas with an H$_2$/CO ratio close to 1. This reaction transforms the alkene into an aldehyde, which then may be hydrogenated to obtain the alcohol. An illustration of this chemistry is found in WO 2007/066036. Commercial examples of these alcohols are the products sold by the company SASOL™ under the trade name Lial™, Isalchem™, Alchem™ and Safol™, or by the company BASF™ under the trade name Lutensol™

The fact of indicating that the terminal group R' of the monomer of formula (I) consists of at least one group of formula (II)—and not that it consists exclusively of this group—is related to the fact that the initial oxo alcohol results from the hydroformylation reaction mentioned above, which can also lead to the formation of linear alcohols. In addition, in this formula, the value indicated for p+q is the one relative to the majority species, since commercial oxo alcohols are generally blends or fractions.

Although these alcohols have previously been used in the field of detergents as described in EP 1 294 837 and U.S. Pat. No. 4,280,919, their use for the synthesis of an associative monomer is novel. Advantageously, oxo alcohols are well-known for having a high degree of biodegradability as described in U.S. Pat. No. 4,280,919, and thus their use may offer special benefits in view of the current legislative environment.

Accordingly these and other objects are obtained according to the present invention, a first embodiment of which provides a monomer of formula (I):

wherein:
  m and n are integers of less than 150, at least one of which is non-zero,
  A and B designate alkyl groups which are different one from another, and have 2 to 4 carbon atoms, where group AO preferentially designates ethylene oxide, and group BO preferentially designates propylene oxide,
  R designates a polymerisable unsaturated group, preferentially methacrylate, and
  R' is at least one group of formula (II):

where p and q designate integers, at least one of which is non-zero, with 5<p+q<13, r is an integer between 0 and 5, preferentially equal to 0.

In a preferred embodiment, the monomer is of formula (I) wherein n=0, AO designates ethylene oxide, and m is between 20 and 40.

In another embodiment, the invention provides a HASE-type polymer, obtained by polymerization of monomers, comprising:
  a) of (meth)acrylic acid,
  b) of at least one ester of (meth)acrylic acid, and
  c) of at least one monomer of formula (I).

The HASE-type polymers according to the invention may be made by conventionally known methods of polymerization as described in the articles cited previously as technological background of the present invention. The effect of the quantity of chain transfer agent used in the synthesis, which is another embodiment of this invention will be described later in this invention.

In an especially preferred embodiment, the invention provides a polymer, obtained by polymerization of a monomer composition containing, as expressed as a by weight of each of its monomers:
  a) 20% to 50%, preferentially 35% to 45%, of (meth) acrylic acid,
  b) 40% to 70%, preferentially 45% to 55%, of at least one ester of (meth)acrylic acid,
  c) 2% to 20%, preferentially 3% to 15%, of at least one monomer of formula (I):

In another specially preferred embodiment, in the polymer of the immediately above described composition, in the monomer of formula (I), n=0, AO designates the ethylene oxide, and m is between 20 and 40.

In a further embodiment, the invention provides a method for manufacture of a HASE-type polymer, through contact in a reactive medium between:

a) (meth)acrylic acid,
b) at least one ester of (meth)acrylic acid, and
c) at least one monomer of formula (I), optionally adding in the reactive medium, before and/or during and/or after the contact between the constituents a), b) and c), at least one chain transfer agent.

In a highly preferred embodiment, a transfer agent is used and its mass introduced into the reactive medium is between 1,500 ppm and 4,000 ppm relative to the total weight of constituents a), b) and c). In a completely unexpected manner, the Newtonian character of the rheological profile caused by the polymer in the water is improved, whilst maintaining a substantial thickening efficacy at a high shearing gradient.

In a further extension of this highly preferred embodiment, the monomer of formula (I) is of a structure wherein n=0, AO designates the ethylene oxide, and m is between 20 and 40.

The result obtained according to this preferred embodiment is contrary to the general teaching that the introduction of a chain transfer agent will in all cases reduce the thickening efficacy of the polymer (see for example, page 7 of EP 0 013 836 A1). More precisely, it is also known that an excess of transfer agent (at least 0.1%-1,000 ppm—by weight relative to the total weight of the engaged monomers) leads to an improvement of the Newtonian profiles and, concomitantly, to a loss of thickening power across the entire range of shear ("Tailoring HASE Rheology through Polymer Design", JCT Research, vol. 2, n° 6, April 2005, pp. 423-433).

In another embodiment, the reactive medium contains water or a mixture of water and an organic solvent. Preferably water is the only solvent.

Examples of suitable chain transfer agents according to the invention include N-dodecyl mercaptan, N-decyl mercaptan, octyl mercaptan, 1,8-dimercapto-3,6-dioxaoctane (DMDO, n° CAS: 14970-87-7), and thiolactic acid.

In another preferred embodiment of the invention, a method to control the rheological properties of an aqueous composition by adding the HASE-type polymers according to formula (I) is provided.

In a further preferred embodiment, an aqueous formulation, preferably, an aqueous paint formulation containing the HASE-type polymer according to the present invention is provided.

Having generally described this invention, a further understanding can be obtained by reference to certain specific examples which are provided herein for purposes of illustration only, and are not intended to be limiting unless otherwise specified.

EXAMPLES

Example 1

This test illustrates the use of associative thickening agents according to the prior art (HASE) and according to the invention, with a view to thickening an aqueous gel.

For each of the tests n° 1 to 6, a fixed mass equal to 10.7 grams of the thickening agent for testing, together with approximately 1 gram of a neutralising solution of ammonium hydroxide at 28%, were introduced into 215 grams of an aqueous solution consisting of 40 grams of deionised water and 175 grams of an acrylic binder Neocryl XK 90 sold by the company DSM™.

Test n° 1

This test illustrates the prior art and uses a HASE-type associative thickening agent sold by the company COATEX™ under the name Rheotech™ 2100. This thickening agent contains alkylphenols.

Test n° 2
This test illustrates the prior art and uses a HASE-type associative thickening agent sold by the company ROHM & HAAS™ under the name Acrysol™ RM5.

Test n° 3
This test illustrates the invention and uses a HASE-type associative thickening agent according to the invention, which is a polymer consisting, by % by weight of each of its monomers, of:
a) 35.5% of methacrylic acid,
b) 52.5% of ethyl acrylate,
c) 12.0% of a monomer of formula (I), in which m=30, n=0, AO designates ethylene oxide, R designates the methacrylate group, R' designates the group of formula (II) where p+q=10, r=0.

This polymer was obtained through contact in a reactive medium which is water, of all the abovementioned monomers, in the presence of a chain transfer agent which was dodecyl mercaptan.

Tangibly, in a 1-liter reactor, 409 grams of bipermuted water and 5.6 grams of sodium dodecyl sulphate were weighed. The base of the tank was then heated to 82° C.±2° C. During this time, a pre-emulsion was prepared by weighing the following in a beaker:
116.8 grams of bipermuted water,
1.96 grams of sodium dodecyl sulphate,
0.139 grams of dodecyl mercaptan, or 556 ppm of mercaptan relative to the mass of all the engaged monomers
88.84 grams of methacrylic acid;
131.1 grams of ethyl acrylate,
30.0 grams of macromonomer
0.8 grams of ammonium persulphate was then weighed, diluted in 6 grams of bipermuted water for the first catalyst, and 0.08 grams of sodium metabisulphite diluted in 4 grams of bipermuted water for the second catalyst. When the base of the tank was at the required temperature both catalysts were added, and polymerisation was effected for 2 hours at 84° C.±2° C., with simultaneous addition of the pre-emulsion. The pump was rinsed with 20 grams of bipermuted water, and was fired for 1 hour at 84° C.±2° C. Finally it was cooled to ambient temperature and was filtered.

Test n° 4
This test illustrates the invention and uses a HASE-type associative thickening agent according to the invention, which is a polymer consisting, by % by weight of each of its monomers, of:
a) 35.5% of methacrylic acid,
b) 52.5% of ethyl acrylate,
c) 12.0% of a monomer of formula (I), in which m=25, n=0, AO designates ethylene oxide, R designates the methacrylate group, R' designates the group of formula (II) where p+q=10, r=0.

This monomer was obtained by ethoxylation of the commercial product Lial 123, and then made polymerisable by functionalisation using a methacrylate group. Ethoxylation was undertaken by methods well known to the skilled man in the art. The same applies to the functionalisation.

This polymer was obtained through contact in a reactive medium which was water, of all the abovementioned monomers, in the presence of 560 ppm of a chain transfer agent which was dodecyl mercaptan.
Its synthesis was accomplished as indicated in test n° 3.

Test n° 5
This test illustrates the invention and uses a HASE-type associative thickening agent according to the invention, which is a polymer consisting, by % by weight of each of its monomers, of:
a) 35.5% of methacrylic acid,
b) 52.5% of ethyl acrylate,
c) 12.0% of a monomer of formula (I), in which m=25, n=0, AO designates ethylene oxide, R designates the methacrylate group, R' designates the group of formula (II) where p= and q=10, r=0.

This monomer was obtained by ethoxylation of the commercial product Lial 123, and then made polymerisable by functionalisation using a methacrylate group. Ethoxylation was undertaken by methods well known to the skilled man in the art. The same applies to the functionalisation.

This polymer was obtained through contact in a reactive medium which was water, of all the abovementioned monomers, in the presence of 560 ppm of a chain transfer agent which was dodecyl mercaptan.
Its synthesis was accomplished as indicated in test n° 3.

Test n° 6
This test illustrates the invention and uses a HASE-type associative thickening agent according to the invention, which is a polymer consisting, by % by weight of each of its monomers, of:
a) 34.0% of methacrylic acid,
b) 51.0% of ethyl acrylate,
c) 15.0% of a monomer of formula (I), in which m=25, n=0, AO designates ethylene oxide, R designates the methacrylate group, R' designates the group of formula (II) where p= and q=10, r=0.

This monomer was obtained by ethoxylation of the commercial product Lial 123, and then made polymerisable by functionalisation using a methacrylate group. Ethoxylation was undertaken by methods well known to the skilled man in the art. The same applies to the functionalisation.

This polymer was obtained through contact in a reactive medium which was water, of all the abovementioned monomers, in the presence of 560 ppm of a chain transfer agent which was dodecyl mercaptan.
Its synthesis was accomplished as indicated in test n° 3.
The Brookfield™ viscosities to 10 and 100 revolutions per minute (Brook 10T, Brook 100T in mPa·s), Stormer™ (in KU) and ICI™, like the ratio between the Brookfield™ viscosity at 10 revolutions/minute and the ICI™ viscosity, are given in table 1.

TABLE 1

| Test n° | 1 | 2 | 3 | 4 | 5 | 6 |
|---|---|---|---|---|---|---|
| Prior Art/Invention | PA | PA | IN | IN | IN | IN |
| ICI | 2.3 | 1.1 | 3.8 | 3 | 2.3 | 3.8 |
| Brook.10T | 4,120 | 3,560 | 7,800 | 3,560 | 3,320 | 6,560 |
| Brook.100T | 2,940 | 1,300 | 4,900 | 2,430 | 1,840 | 4,300 |
| Stormer | 113 | 83 | 134 | 108 | 98 | 129 |
| Brook.10T/ICI | 1,791 | 3,236 | 2,053 | 1,187 | 1,443 | 1,726 |

These results demonstrate that the HASE polymers of the invention enable a more marked Newtonian profile to be obtained than with the HASE polymer of the prior art of referenced RM 5, with a much greater thickening efficacy at a high shearing gradient.

In terms of the Newtonian character, the performance of the product Rheotech™ 2100 containing alkyl phenols is at least equalled, and it is substantially improved in terms of the ICI viscosity.

Example 2

This test illustrates the use of associative thickening agents according to the invention, with a view to thickening an aqueous gel. It notably illustrates the influence of the quantity of chain transfer agent used during the synthesis of the said thickening agent. For each of the tests n° 7 to 12, a fixed mass equal to 10.7 grams of the thickening agent for testing, together with approximately 1 gram of a neutralising solution of ammonium hydroxide at 28%, was introduced into 215 grams of an aqueous solution consisting of 40 grams of deionised water and 175 grams of an acrylic binder Neocryl XK 90 sold by the company DSM™.

Test n° 7

This test illustrates the prior art and uses a HEUR-type associative thickening agent sold by the company COATEX™ under the name Coapur™ 2025.

Test n° 8

This test illustrates the invention and uses a HASE-type associative thickening agent according to the invention, which is a polymer consisting, by % by weight of each of its monomers, of:
  a) 35.5% of methacrylic acid,
  b) 52.5% of ethyl acrylate,
  c) 12.0% of a monomer of formula (I), in which m=25, n=0, AO designates ethylene oxide, R designates the methacrylate group, R' designates the group of formula (II) where p= and q=10, r=0.

This monomer was obtained by ethoxylation of the commercial product Lial™ 123, and then made polymerisable by functionalisation using a methacrylate group. Ethoxylation was undertaken by methods well known to the skilled man in the art. The same applies to the functionalisation.

This polymer was obtained through contact in a reactive medium which was water, of all the abovementioned monomers, in the presence of 1,392 ppm of a chain transfer agent which was dodecyl mercaptan.

Its synthesis was accomplished as indicated in test n° 3.

Test n° 9

This test illustrates the invention and uses a HASE-type associative thickening agent according to the invention, which is the same polymer as the one used in test n° 8.

This polymer was obtained through contact in a reactive medium which is water, of all the abovementioned monomers, in the presence of 1,944 ppm of a chain transfer agent which was dodecyl mercaptan.

Its synthesis was accomplished as indicated in test n° 3.

Test n° 10

This test illustrates the invention and uses a HASE-type associative thickening agent according to the invention, which is the same polymer as the one used in test n° 8.

This polymer was obtained through contact in a reactive medium which was water, of all the abovementioned monomers, in the presence of 2,840 ppm of a chain transfer agent which was dodecyl mercaptan.

Its synthesis was accomplished as indicated in test n° 3.

Test n° 11

This test illustrates the invention and uses a HASE-type associative thickening agent according to the invention, which is the same polymer as the one used in test n° 8.

This polymer was obtained through contact in a reactive medium which was water, of all the abovementioned monomers, in the presence of 4,160 ppm of a chain transfer agent which was dodecyl mercaptan.

Its synthesis was accomplished as indicated in test n° 3.

Test n° 12

This test illustrates the invention and uses a HASE-type associative thickening agent according to the invention, which is the same polymer as the one used in test n° 8.

This polymer was obtained through contact in a reactive medium which was water, of all the abovementioned monomers, in the presence of 5,600 ppm of a chain transfer agent which was dodecyl mercaptan.

Its synthesis was accomplished as indicated in test n° 3.

The Brookfield™ viscosities at 10 and 100 revolutions per minute, Stormer™ and ICI™, like the ratio between the Brookfield™ viscosity at 10 revolutions per minute and the ICI™ viscosity, are given in table 2.

TABLE 2

| Test n° | 7 | 8 | 9 | 10 | 11 | 12 |
|---|---|---|---|---|---|---|
| Prior Art/Invention | PA | IN | IN | IN | IN | IN |
| ICI | 2.2 | 3.3 | 3.2 | 2.9 | 2.5 | 2.2 |
| Brook10T (mPa.s) | 1,520 | 3,440 | 2,120 | 1,920 | 1,720 | 1,240 |
| Brook100T (mPa.s) | 1,184 | 2,610 | 1,840 | 1,630 | 1,480 | 1,130 |
| Stormer (KU) | 83 | 111 | 101 | 97 | 94 | 86 |
| Brook10T/ICI | 690 | 1,042 | 663 | 662 | 688 | 564 |

Apart from the fact that this table continues to demonstrate the capacity of the polymers according to the invention to thicken an aqueous gel over a wide range of shearing gradients, the influence of the rate of chain transfer agent on the rheology of this gel is also demonstrated.

The value of the Brookfield viscosity ratio at 10 revolutions per minute/ICI viscosity is substantially reduced when this rate is increased, thus a behaviour which is very Newtonian is obtained.

An optimum compromise between this ratio and the maintenance of the ICI viscosity at a high level is obtained for tests 9 and 10, which illustrate the preferential variant of the invention. According to this variant, the results of the HEUR thickening agent of the prior art are improved in terms of the Newtonian behaviour, but above all of the thickening performance at a high shearing gradient is also very good.

The invention claimed is:

1. A monomer composition of formula (I):

$$R\text{-}(AO)_m\text{-}(BO)_n\text{—}R' \qquad (I),$$

wherein:
  m is an integer between 20 and 40, and
  n is an integer of less than 150,
  A is ethylene, and
  B is an alkylene group having 3 to 4 carbon atoms;
  R is a polymerisable unsaturated group;
  R' is a mixture comprising linear alkyl groups of 9 to 20 carbons and a branched alkyl group of formula (II):

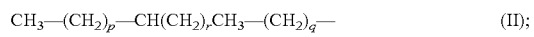

$$CH_3\text{—}(CH_2)_p\text{—}CH(CH_2)_r CH_3\text{—}(CH_2)_q\text{—} \qquad (II);$$

wherein
  p and q are each independently an integer, at least one of which is non-zero, such that: 5<p+q<13; and
  r is an integer between 0 and 5, inclusive.

2. The monomer composition according to claim 1, wherein:
  n equals 0.

3. The monomer composition according to claim 1, wherein:
  BO is polymerized propylene oxide.

4. The monomer composition according to claim 1, wherein R is methacrylate.

5. A hydrophobically modified Alkali-Soluble Emulsions (HASE) polymer, obtained by copolymerizing a monomer mixture comprising:
  a) (meth)acrylic acid;
  b) an ester of (meth)acrylic acid; and
  c) the monomer composition of formula (I) according to claim 1.

6. The HASE polymer according to claim 5, wherein the monomer mixture comprises:
20% to 50% of the (meth)acrylic acid,
a) 40% to 70% of at least one ester of (meth)acrylic acid,
b) 2% to 20% of a monomer composition of formula (I).

7. The HASE polymer according to claim 5, wherein:
n equals 0; and
m is an integer between 20 and 40.

8. A method for thickening an aqueous formulation, the method comprising adding the HASE polymer according to claim 5 to an aqueous formulation.

9. A water based paint, comprising the HASE polymer according to claim 5.

10. A method for manufacturing a HASE polymer, the method comprising:
1) copolymerizing in a reactive medium a monomer mixture comprising:
a) (meth)acrylic acid;
b) an ester of (meth)acrylic acid; and
c) the monomer composition of formula (I) according to claims 1; and
2) optionally introducing at least one chain transfer agent to the reactive medium before, during and/or after the copolymerizing.

11. The method according to claim 10, wherein between 1,500 ppm and 4,000 ppm of the transfer agent is introduced to the reactive medium relative to a total weight of the monomers a), b) and c).

12. The method according to claim 11, wherein the chain transfer agent is selected from the group consisting of N-dodecyl mercaptan, N-decyl mercaptan, octyl mercaptan, 1,8-dimercapto-3,6-dioxaoctane and thiolactic acid.

13. The method according to claim 10,
wherein:
n equals 0; and
m represents an integer between 20 and 40.

14. The method according to claim 10, wherein the reactive medium further comprises water and, optionally, an organic solvent.

15. The monomer composition according to claim 1 wherein r is 0.

* * * * *